No. 686,647. Patented Nov. 12, 1901.
W. H. BOOTH.
FISHING ROD.
(Application filed July 5, 1901.)
(No Model.)
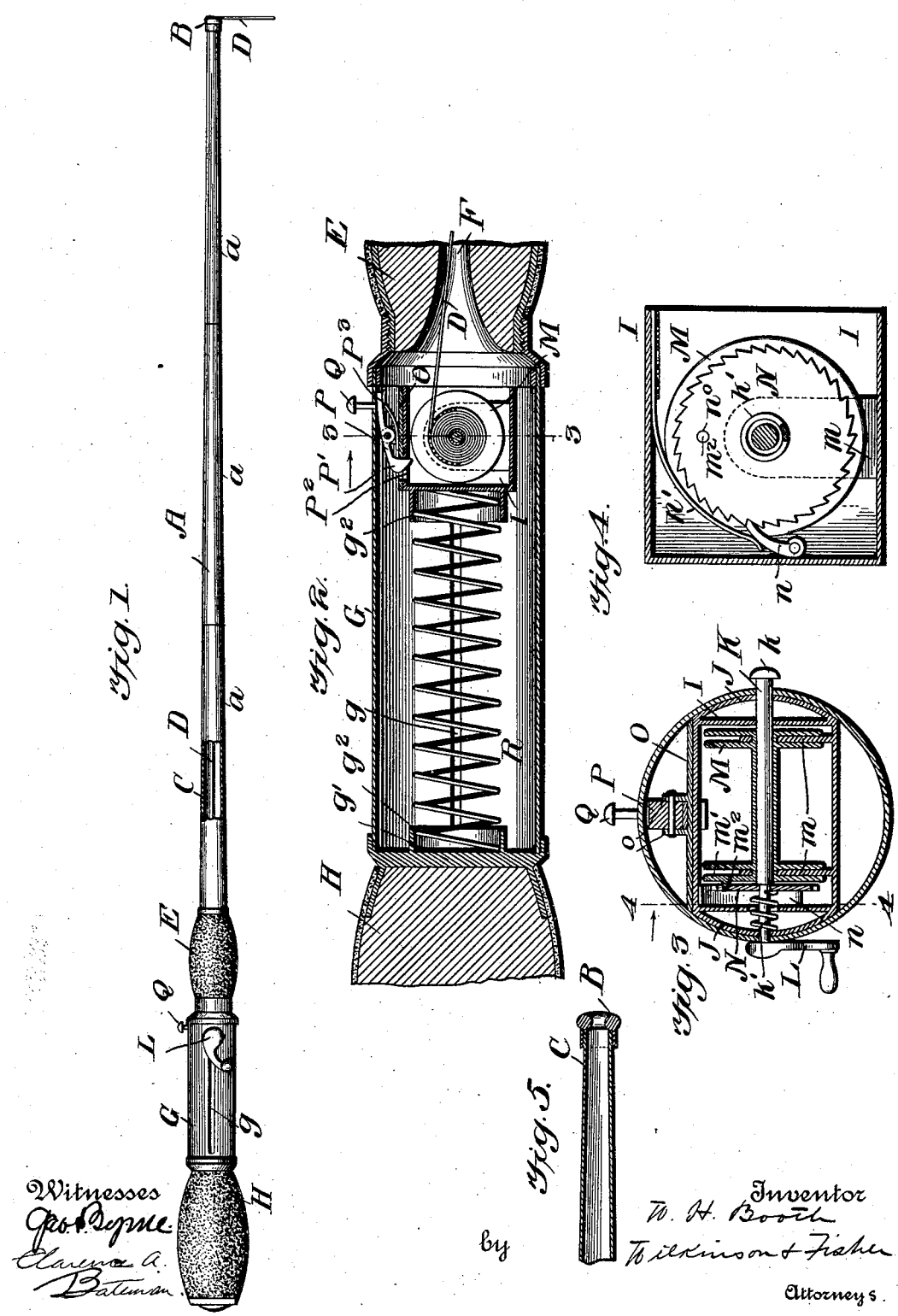

UNITED STATES PATENT OFFICE.

WILLIAM H. BOOTH, OF BATON ROUGE, LOUISIANA.

FISHING-ROD.

SPECIFICATION forming part of Letters Patent No. 686,647, dated November 12, 1901.

Application filed July 5, 1901. Serial No. 67,189. (No model.)

*To all whom it may concern:*

Be it known that I, WILLIAM H. BOOTH, a citizen of the United States, residing at Baton Rouge, in the parish of East Baton Rouge and State of Louisiana, have invented certain new and useful Improvements in Fishing-Rods; and I do hereby declare the following to be a full, clear, and exact description of the invention, such as will enable others skilled in the art to which it appertains to make and use the same.

My invention relates to improvements in fishing-rods, and has for its object to provide the rod with an attachment whereby the fish is hooked upon the line through the action of a spring, thereby superseding the old method of snapping the line up manually to effect the same result. It also provides certain features of novelty over other poles that will hereinafter appear.

Referring to the drawings, Figure 1 represents a view, partly in section, of my improved rod. Fig. 2 represents an enlarged sectional view of a portion of the same. Fig. 3 represents a sectional view, enlarged, upon the line 3 3, Fig. 2, and looking in the direction of the arrow. Fig. 4 represents an enlarged sectional view on the line 4 4, Fig. 3, looking in the direction of the arrow; and Fig. 5 represents in sectional view the end of the rod.

Similar parts are designated by the same reference-letters throughout the several views.

A represents the rod, preferably composed of several lengths of tapering tubular sections $a$ $a$, detachably connected together in any suitable manner. This rod carries at its outer end a rounded ferrule B, screwed upon the end of the last section of the rod. These tubes have a bore C running longitudinally throughout the length of the rod, through which passes the line D. This rod A is connected at its lower end with the forward grip E, provided with the passage F, through which passes the line D. The opposite end of this grip E is detachably connected to the hollow cylindrical casing G, to the lower end of which is secured the grip H. This cylindrical casing G is slotted longitudinally on opposite sides, as shown at $g$ $g$. Within the casing G slides longitudinally the rectangular reel-holder I. This holder or carrier is provided with the segmental or curved portions J J upon two or more sides, adapted to guide the holder in the casing. Passing through the slots $g$ $g$ in the casing G and through the sides of the reel-holder I is a shaft K, having at one end the knob $k$ and at its opposite end is narrowed and provided with the crank L. Upon this shaft K is loosely mounted the reel M, which is also revolubly mounted in the standards $m$ $m$ of the reel-holder I. To the narrowed portion of said shaft K is rigidly secured the ratchet-wheel N, and upon the reel-holder I is secured the pawl $n$, upon which acts the spring $n'$. Between the ratchet N and the side of the box J is interposed a coiled spring $k'$, allowing the shaft to be thrust toward the left, but normally tending to retain it in the position shown in Fig. 3.

Upon the flange $m'$ of the reel M is provided the stop or projection $m^2$, which normally engages the perforation $n^0$ of the ratchet-wheel N, but when the ratchet is drawn outwardly with the shaft the same are separated.

Mounted in the upper forward end of the casing G is a support O, upon the supports $o$ $o$ of which is pivoted a detent or pawl P, acted upon by the spring $P^3$. Connected to this pawl and extending through the casing G is a press button or stud Q. The pawl P is provided with the pointed lug $P'$, which registers with the opening $P^2$ in the reel-holder when the same is in its extreme forward position.

R is a coiled spring under tension, having one end attached to the reel-holder and its opposite end connected to the rear end $g'$ of the casing G, cups or recesses $g^2$ $g^2$ being provided to guide the spring. This spring is constantly tending to draw the reel-holder and the reel back, but is prevented by the pawl or detent P.

The operation of the device is as follows: First the line D is unwound from the reel M until it is of the required length. This is effected by pressing the finger upon the knob $k$ and giving the shaft a lateral thrust, thereby disengaging the stop $m^2$ from the hole $n^0$, the reel M being so mounted as to freely unwind when thus released. When it is desired to shorten the line, the crank L is turned to the right, the pawl n engaging the teeth of the ratchet-wheel N, preventing any retrogression of the reel and crank, the reel now being locked to the ratchet-wheel by the stud or stop $m^2$. When the device is in readiness, the reel-holder, carrying the reel M, is drawn up into the forward position (see Fig. 2) and is there automatically locked by the pawl P. When a "bite" is detected upon the line, the knob Q is pressed with the thumb to release the pawl P from the opening $P^2$ of the reel-holder I, allowing the spring R to quickly retract the reel-holder, carrying the reel M. This reel M being normally locked against unwinding, the line D is consequently drawn back by the reel, thereby snapping up the hook and catching the fish upon the line.

This device is designed as an improvement upon the so-called "automatically-operated" rods, where the biting of the fish is depended upon to automatically bring into action a spring or the like; but these devices are very uncertain in action, and my invention is designed to produce a rod having a positive action.

It is obvious that although the herein-described rod possesses a great many improvements over the ordinary rod, yet the same does not occupy any more space and is just as easily handled as the ordinary rod.

The feature of using a hollow or tubular rod and running the line through the inside of the rod constitutes an improvement over rods of the type heretofore constructed, as it has been the usual practice to run the line upon the outside of the rod, frequently becoming entangled and snapped. It is obvious that this could never happen with my device, as the line and all operating parts are completely inclosed and self-contained.

It is obvious that many changes might be made in my device, as many modifications will suggest themselves to any one skilled in the art to which my invention appertains, and I therefore do not limit myself to the precise details herein shown.

Having thus described my said invention, what I claim, and desire to secure by Letters Patent of the United States, is—

1. In a fishing-rod, the combination with a hollow tubular rod, through which the line passes, and a hollow casing carried by said rod; of a reel mounted to slide within said casing, carrying the line, a spring normally tending to retract said reel, and mechanism for releasing the same, substantially as described.

2. In a fishing-rod, the combination with a hollow rod, through which the line passes, and a cylindrical casing connected to and in alinement with said rod; of a reel-holder within said casing, a reel carrying the line mounted in said holder, a spring normally tending to retract said holder, and manually-operated means for releasing said holder, substantially as described.

3. In a fishing-rod, the combination with the rod, and a hollow casing connected thereto; of a reel-holder slidably mounted therein, a reel mounted within said casing, and means upon the outside of said casing for operating said reel, substantially as described.

4. In a fishing-rod, the combination with the rod, and a hollow casing connected thereto; of a reel-holder slidably mounted therein, a reel mounted within said casing, means upon the outside of said casing for operating said reel, a spring normally tending to retract said reel-holder, and means for releasing the same, substantially as described.

5. In a fishing-rod, the combination with the rod, and a hollow casing connected thereto; of a reel-holder slidably mounted therein, a reel mounted within said casing, means upon the outside of said casing for operating said holder, a pawl within said casing adapted to engage said reel-holder and a releasing-knob extending through said casing, and adapted to be operated from the outside of the same, substantially as described.

6. In a fishing-rod, the combination with the rod, and a hollow slotted casing attached thereto; of a reel-holder slidably mounted in said casing, a shaft capable of longitudinal movement carried by said holder, and passing through said slots, a reel loosely mounted upon said shaft, carrying a stop or stud, a ratchet adapted to be engaged by a pawl upon said holder, rigidly secured to said shaft, having a perforation adapted to engage said stop, said shaft being provided with a winding crank and knob, a pawl mounted in said casing, adapted to engage said holder, and a spring connected to said holder, adapted to retract said holder when said pawl is released, substantially as described.

In testimony whereof I affix my signature in presence of two witnesses.

WILLIAM H. BOOTH.

Witnesses:
T. E. McHUGH,
SAML. M. DOOLEY.